(12) United States Patent
Li et al.

(10) Patent No.: US 10,447,154 B2
(45) Date of Patent: Oct. 15, 2019

(54) PWM CONTROL SCHEME FOR PROVIDING MINIMUM ON TIME

(71) Applicant: Renesas Electronics America Inc., Milpitas, CA (US)

(72) Inventors: Bin Li, Apex, NC (US); Mehul Shah, Cary, NC (US); Minghua Li, Morrisville, NC (US); Eric Solie, Durham, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/030,800

(22) Filed: Jul. 9, 2018

(65) Prior Publication Data

US 2019/0020274 A1 Jan. 17, 2019

Related U.S. Application Data

(60) Provisional application No. 62/532,829, filed on Jul. 14, 2017.

(51) Int. Cl.
*H02M 3/07* (2006.01)
*H02M 3/157* (2006.01)

(52) U.S. Cl.
CPC ............ *H02M 3/07* (2013.01); *H02M 3/157* (2013.01); *H02M 2003/072* (2013.01)

(58) Field of Classification Search
CPC ...................................................... H02M 3/07
See application file for complete search history.

(56) References Cited

U.S. PATENT DOCUMENTS

| | | | |
|---|---|---|---|
| 2004/0189502 A1* | 9/2004 | Lee ...................... | H03M 3/506 341/152 |
| 2011/0316511 A1* | 12/2011 | Wang .................... | H02M 3/156 323/285 |
| 2017/0201086 A1* | 7/2017 | Chen ........................ | H02H 3/08 |

* cited by examiner

*Primary Examiner* — Kyle J Moody
*Assistant Examiner* — Trinh Q Dang
(74) *Attorney, Agent, or Firm* — Foley & Lardner LLP

(57) ABSTRACT

According to certain aspects, the present embodiments are based on an improved switched-capacitor (SC) converter topology that typically does not include an inductor. In particular, the topology includes a ladder SC circuit configured as a cap divider. The cap divider can be used to provide an unregulated output voltage Vout that is a certain fraction (e.g. 2) of input voltage Vin, such as Vin/2 (i.e., duty cycle≈50%). In some embodiments of a PWM control scheme for this topology, the PWM OFF pulse is free running, determined by the logic combination of timer and VOUT comparator. The PWM OFF pulse width is measured and used as the reference for a minimum PWM ON timer. The PWM ON pulse is therefore forced to be at least a minimum width that is proportional to the PWM OFF pulse. A UVOV protection window can be added to ignore the minimum PWM ON timer during a load transient.

20 Claims, 8 Drawing Sheets

PWM CONTROL SCHEME FOR PROVIDING MINIMUM ON TIME

CROSS-REFERENCE TO RELATED APPLICATIONS

The present application claims priority to U.S. Provisional Patent Application No. 62/532,829 filed Jul. 14, 2017, the contents of which are incorporated herein by reference in their entirety.

FIELD OF THE INVENTION

The present embodiments relate to mobile power management, and more particularly to a PWM control scheme that provides a minimum ON time.

BACKGROUND

DC-DC converters receive an input voltage from an input source (e.g., mains power, battery, etc.) and use it to provide an output voltage to loads (e.g., computers, IoT appliances, etc.). Conventional DC-DC converters frequently employ topologies that include inductors and power switches such as power MOSFETs. Such inductor-based topologies are problematic and/or they present certain design considerations which are not often easy to resolve.

SUMMARY

According to certain aspects, the present embodiments are based on an improved switched-capacitor (SC) converter topology that typically does not include an inductor. In particular, the topology includes a ladder SC circuit configured as a cap divider. The cap divider can be used to provide an unregulated output voltage Vout that is a certain fraction (e.g. 2) of input voltage Vin, such as Vin/2 (i.e., duty cycle≈50%). In some embodiments of a PWM control scheme for this topology, the PWM OFF pulse is free running, determined by the logic combination of timer and VOUT comparator. The PWM OFF pulse width is measured and used as the reference for a minimum PWM ON timer. The PWM ON pulse is therefore forced to be at least a minimum width that is proportional to the PWM OFF pulse. A UVOV protection window can be added to ignore the minimum PWM ON timer during a load transient.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present embodiments are based on an improved switched-capacitor (SC) converter topology that typically does not include an inductor. In particular, the topology includes a ladder SC circuit configured as a cap divider. The cap divider can be used to provide an unregulated output voltage Vout that is a certain fraction (e.g. 2) of input voltage Vin, such as Vin/2 (i.e., duty cycle≈50%). So it can be used to generate 1S voltage from a 2S battery, for example. Since it has an inductorless topology, it can achieve relatively small board space, reduced loss and high efficiency (>96%, especially at light loads) as compared to inductor-based topologies. A variable frequency modulation (VFM) scheme is used to modulate the gate driving signals based on load conditions, for example.

Figure 1:
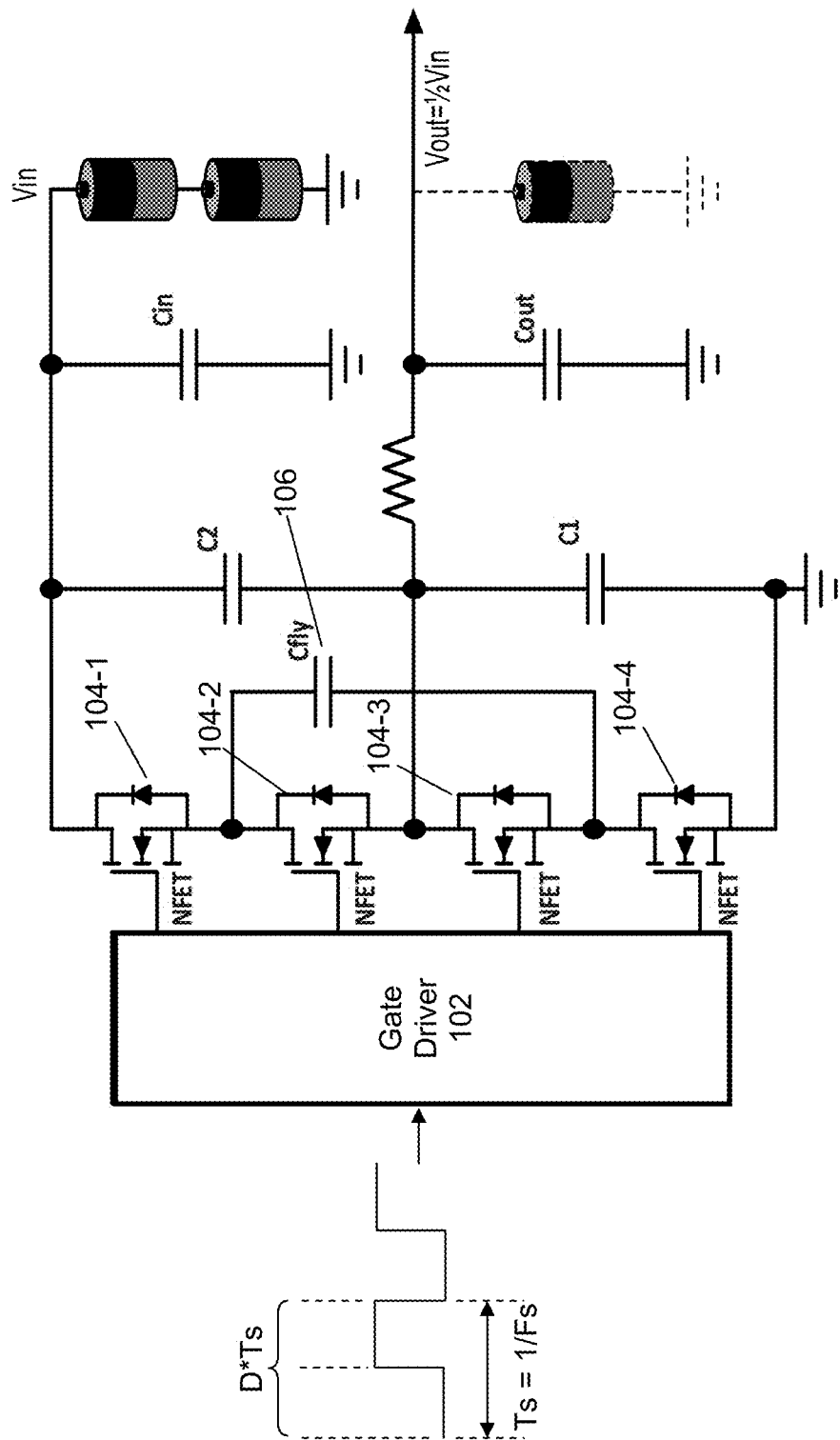
FIG. 1 is a block diagram illustrating an example voltage regulator having a cap divider topology.

FIG. 1 is a block diagram illustrating an example cap divider topology for a SC converter. As shown in this example, an input voltage Vin is provided by a 2S battery. The example Vout is shown as equivalent to a 1S battery (i.e. Vout=Vin/2). A Gate Driver 102 drives four switches (e.g.

NFETs) 104 coupled between Vin, Vout and ground so as to charge and discharge a flying capacitor Cfly 106, and thereby transfer the energy from the input to the output. As further shown in FIG. 1, a gate driving signal is sent to Gate Driver 102 to drive NFETs 104 as will be described in more detail below. The gate driving signal has a switching frequency Fs, a switching period Ts, and a duty cycle D, which in this case will ideally be about 50% due to the ratio of the input and output voltages Vin and Vout in this illustrated embodiment. However, other duty cycle ratios are possible for this embodiment and other embodiments (e.g. Vout=Vin/3, Vout=Vin/4, Vout=2Vin, Vout=3Vin, Vout=4Vin, etc.) to achieve certain performance metrics such as efficiency, ripple, or acoustic noise. Moreover, although Vin is shown in this example as being provided by a battery, other types of power sources are possible, such as power from an adapter, a power bank or other supplies that provide an adequate DC voltage. Vout can be provided to any type of load such as a CPU voltage regulator, an electronic load, a battery, a portable device, an IoT appliance, etc.

As will be appreciated by those skilled in the art, the switched capacitor converter shown in FIG. 1 adopts a ladder topology, which topology can be easily extended to other embodiments in which other Vout-Vin ratios are desired. For example, the circuit in FIG. 1 can be adapted for use for providing a Vout=Vin/3 ratio and/or a Vout=2Vin/3 ratio with the addition of two or more switched capacitors (i.e. flying capacitors and associated switches). However, further details thereof will be omitted here for sake of clarity of the invention. It should also be noted that the present embodiments are not limited to a ladder topology, and other topologies are possible, such as a serial-parallel topology, a doubler topology, etc., and those skilled in the art will be able to understand how to implement the present embodiments in such other topologies after being taught by the present examples.

Figure 2B:
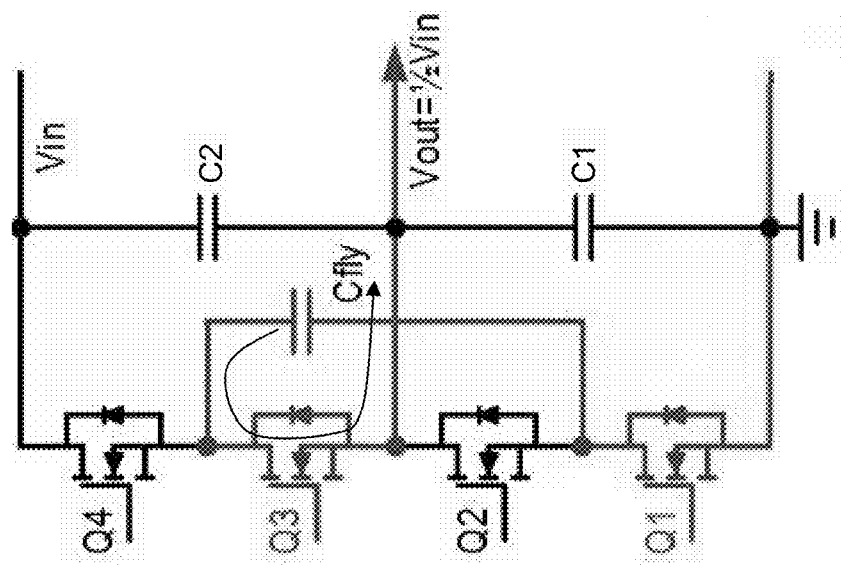
FIGS. 2A and 2B illustrate operational aspects of charging and discharging a flying capacitor in the cap divider topology.
Figure 2A:
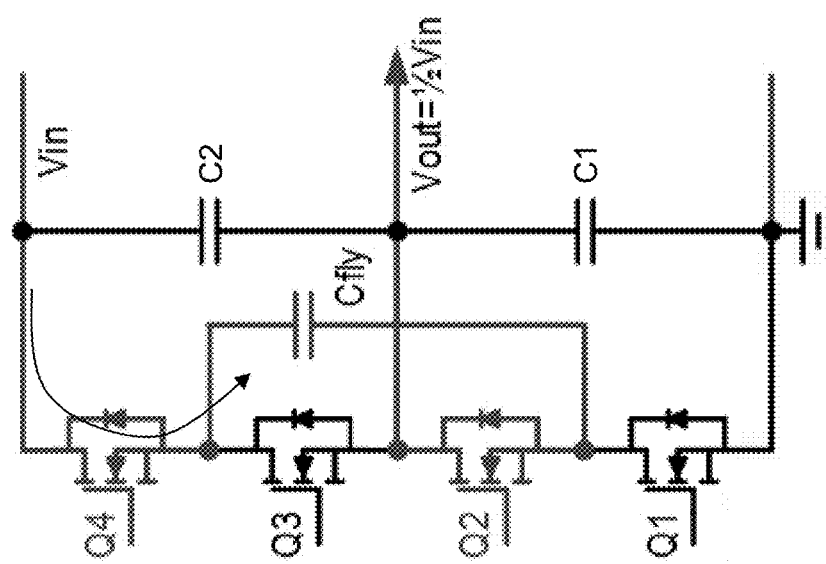

FIGS. 2A and 2B illustrate operational aspects of the switched capacitor DC-DC converter according to embodiments in more detail. As shown in FIG. 2A, to charge the flying capacitor Cfly, the NFETs Q2 and Q4 are switched on while the NFETs Q1 and Q3 are switched off (e.g., in accordance with a PWM OFF pulse). This causes the flying capacitor Cfly to be charged from the input (specifically, transferring the charge to Cfly from "decoupling" capacitor C2 that is switched in parallel with Cfly by Q2 and Q4). As shown in FIG. 2B, to discharge the flying capacitor Cfly, the NFETs Q1 and Q3 are switched on while the NFETs Q2 and Q4 are switched off (e.g., in accordance with a PWM ON pulse), which causes the capacitor to discharge to the output (specifically, transferring the charge from Cfly to "output" capacitor C1 that is switched in parallel with Cfly by Q1 and Q3, and thereby establishing the output voltage Vout at the output). The charging and discharging operations of the flying capacitor thus result in the energy transfer from input to output.

Figure 3:
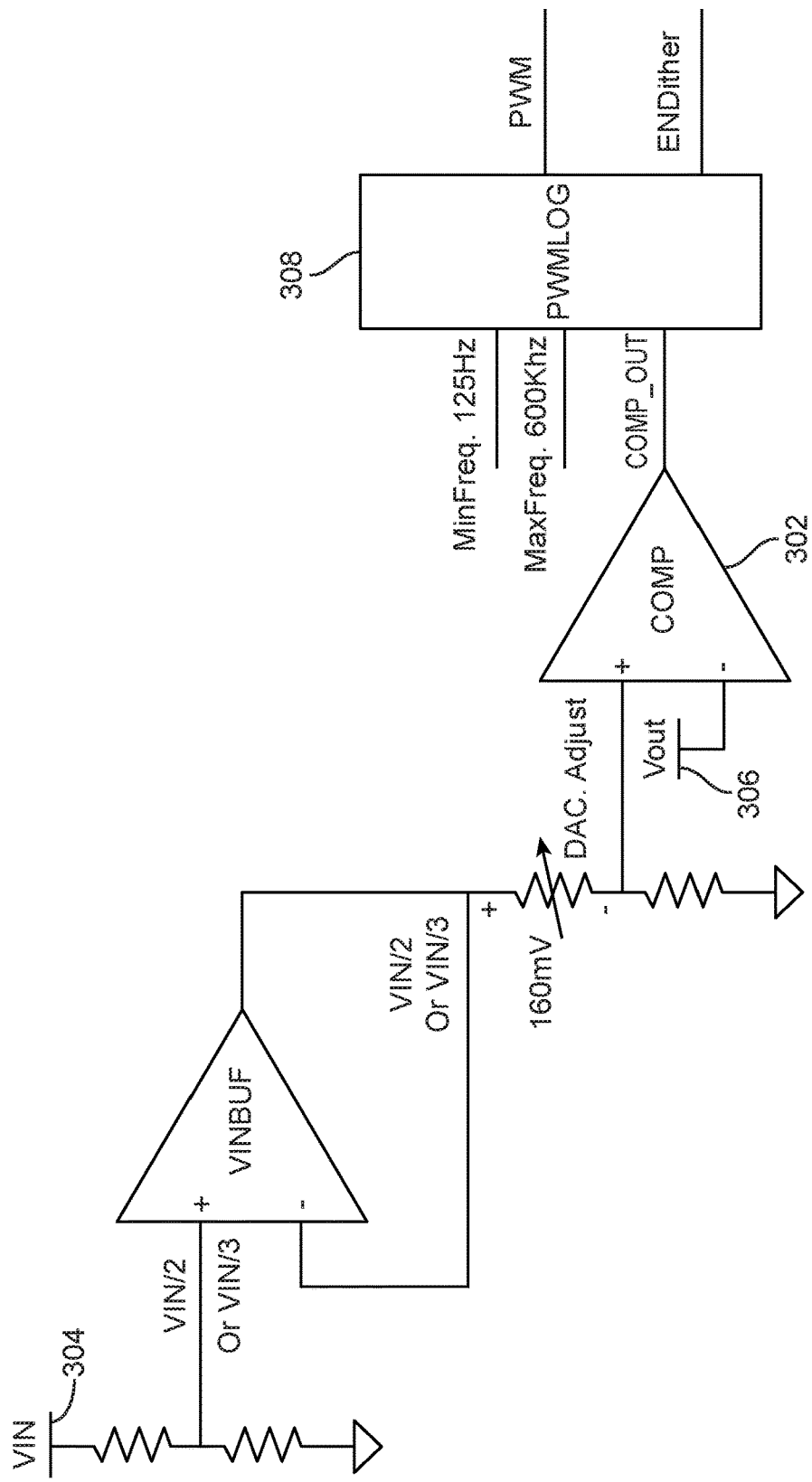
FIG. 3 is a block diagram illustrating one example conventional approach for implementing variable frequency modulation.

As set forth above, although the duty cycle D can remain substantially constant based on the required step-down or input-to-output voltage conversion ratio n (e.g., n=1/2), a variable frequency modulation scheme of the switching frequency Fs is needed to improve performance metrics such as efficiency, ripple, and acoustic noise. One modulation approach is called Vin-Threshold Based Modulation. In this approach, an example of which is shown in FIG. 3, gate driving signal generation is adjusted on the basis of the output of a comparator 302. This approach requires two sensing circuits 304, 306, one for VIN and one for Vout, as well as a comparator 302. Variable frequency modulation is performed by logic 308 on the basis of the results of comparing (VIN*n−VIN threshold) and Vout. In this example, the pulse width modulation (PWM) control scheme is to compare Vout with a buffered threshold (i.e., VIN/2−60 mV).

The present applicant recognizes that, due to such issues as board and component parasitics, the Vout feedback signal is often distorted and results in an unstable PWM ON pulse and jittery performance. A solution to these and other problems is therefore desirable. One possible solution involves differential sensing the voltage across the flying cap and comparing it with a VIN based window voltage to generate the PWM signal. This requires a high voltage differential amplifier, a more complex design and may also be difficult to meet low bias current requirements. Another possible solution involves differential sensing of the output current to fit a pre-defined frequency-load curve. However, in this technique, at light load, the current sense signal may be too small and may need filtering and amplification, making it difficult to meet the low bias current requirement.

Figure 4:
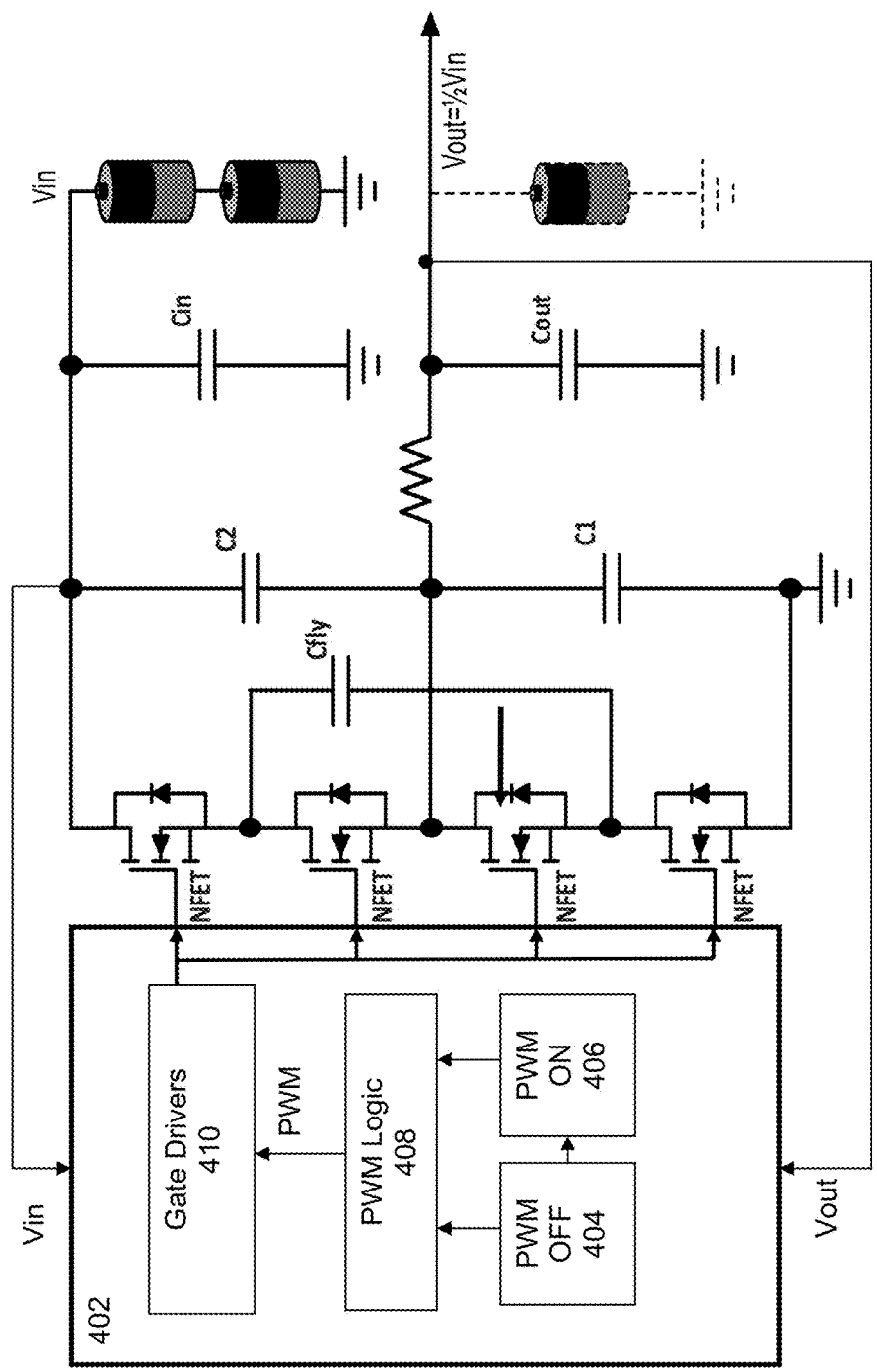
FIG. 4 is a block diagram illustrating an example PWM controller for providing a PWM signal with no less than a minimum ON time according to the present embodiments.

A block diagram illustrating an example implementation of a PWM control scheme according to the present embodiments is shown in FIG. 4. According to certain aspects, in embodiments of a SC converter controller 402 such as that shown in FIG. 4, the PWM OFF pulse is generated by block 404 and is free running, for example determined by the logic combination of a timer and a VOUT comparator. The PWM OFF pulse width from block 404 is measured by PWM ON block 406 and used as a reference for determining the minimum time of the PWM ON pulse. The PWM ON pulse can therefore be forced to be at least a minimum width that is the same as or proportional to the PWM OFF pulse, depending on the desired VIN/VOUT ratio. The outputs of blocks 404 and 406 are combined by PWM logic block 408, which provides the final PWM signal to gate drivers 410. Gate drivers 410 can be implemented similarly to conventional controllers as described above in connection with FIGS. 1 and 2, and so further details thereof are not necessary for understanding the present embodiments. Under voltage and/or over voltage (UVOV) protection can be included in block 408 or elsewhere in controller 402 so as to ignore the minimum PWM ON timer during a load transient, for example.

Figure 5:
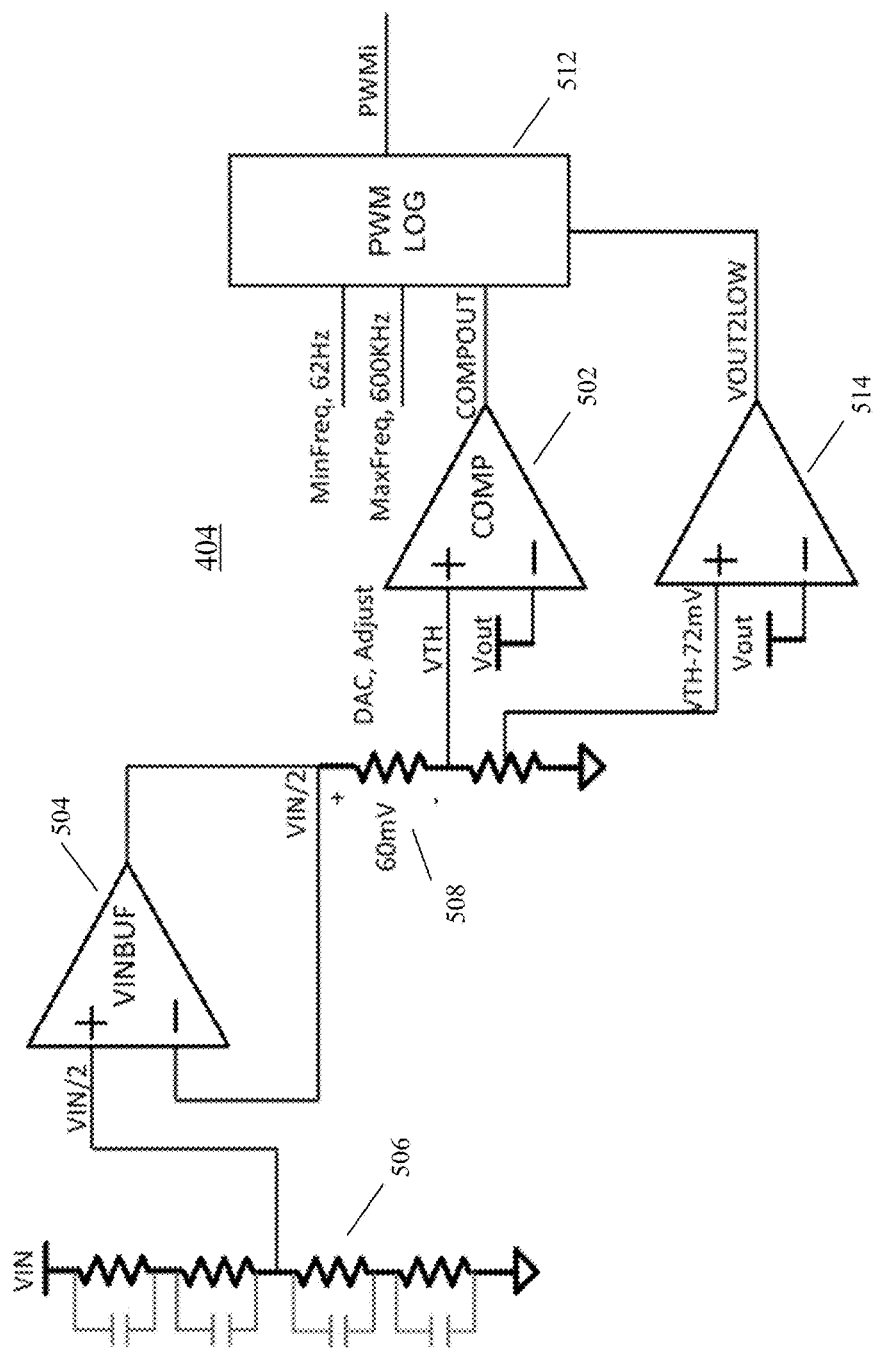
FIG. 5 is a block diagram illustrating an example block for generating a PWM OFF signal in accordance with the present embodiments.

FIG. 5 is a block diagram illustrating an example implementation of PWM OFF block 404.

In this example implementation, similar to the approach shown in FIG. 3, PWM OFF signal generation depends on the output of a comparator 502. Sensing circuit 504 senses and buffers a fraction of the input voltage VIN (e.g. VIN/2) as established by voltage divider 506. This buffered voltage is reduced by a DAC 508 (e.g. by 60 mV) to establish the threshold voltage VTH. Comparator 502 thus compares VTH and Vout, and generates an output COMPOUT based thereon which is provided to PWM logic 512. In general, PWM logic 512 thus outputs an output signal PWMi that transitions to a low state (i.e. PWM OFF) whenever Vout rises higher than VTH. But as further shown in the example of FIG. 5, PWM logic 512 can also receive a minimum frequency and a maximum frequency, and so the PWM OFF can thus be a logic combination of COMPOUT and a desired range of switching frequencies in this example.

In this configuration, PWM logic 512 operates such that PWM OFF is essentially free-running in general operation. However, PWM logic 512 can also receive a signal from under-voltage (UV) protection circuitry 514 (VOUT2LOW), as well as perhaps from over-voltage (OV)

protection circuitry (not shown). These can provide additional operational protections, as will become apparent from the examples below.

Figure 6:
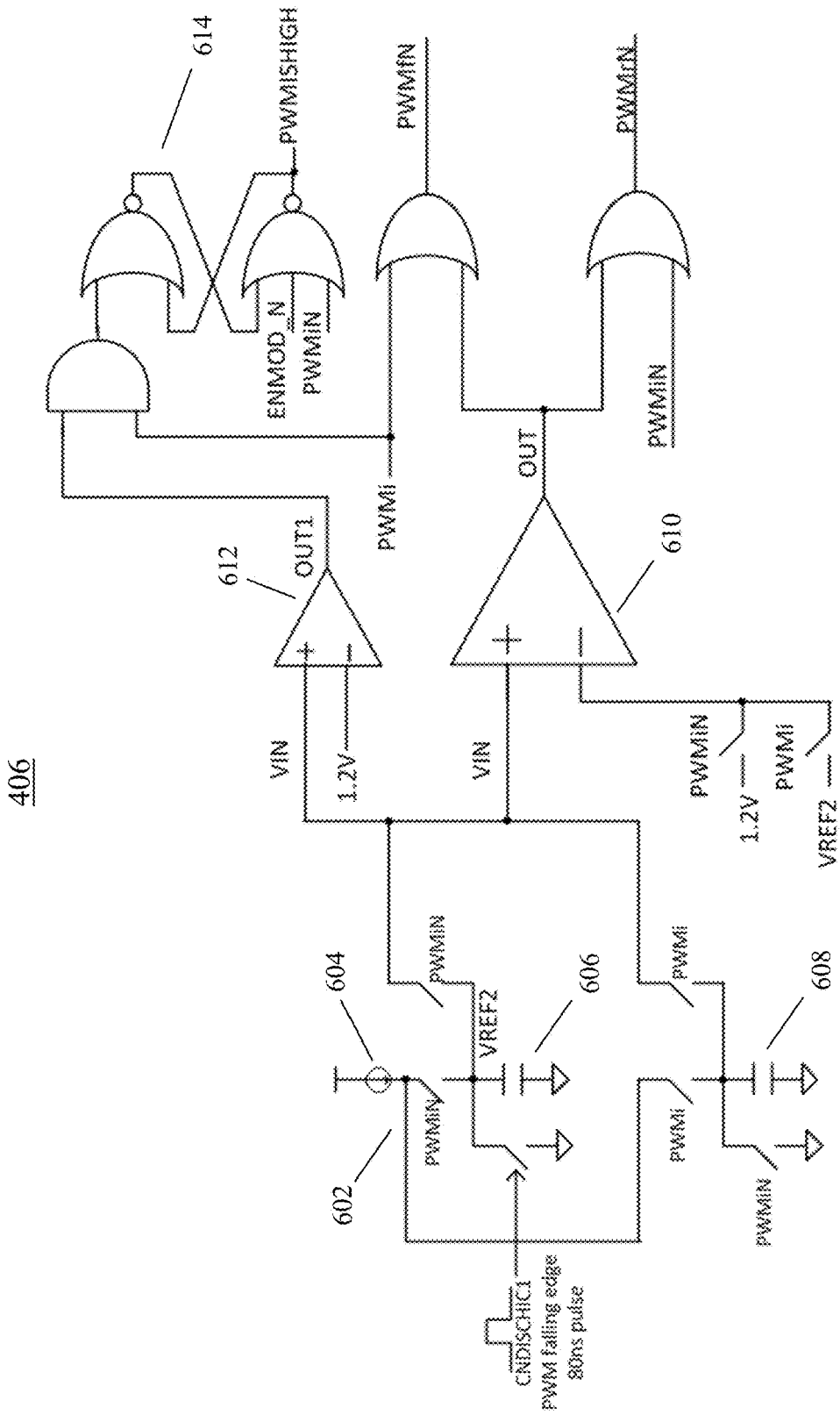
FIG. 6 is a block diagram illustrating an example block for generating a PWM ON signal with no less than a minimum duration in accordance with the present embodiments.

FIG. 6 is a block diagram illustrating an example implementation of PWM ON block 406.

As shown in this example implementation, PWM ON block 406 includes a ping-pong circuit 602 that switches between causing a current source 604 to charge up a capacitor 606 when the PWMi signal from block 404 is low (i.e. during PWM OFF or PWMNi is high) or a capacitor 608 when the PWMi signal is high. Essentially, in this example, the charging and discharging of capacitors 606 and 608 of ping-pong circuit 602 acts to measure the width (i.e. the time duration) of the PWM OFF pulse, which measurement can cause the PWM ON pulse to have the same width and/or time duration.

More particularly, comparator 610 compares the output (VIN) from ping-pong circuit 602 to a threshold, and its output OUT is high whenever the output from ping-pong circuit 602 is above the threshold voltage. As shown in this example, the threshold voltage used by comparator 610 is the variable reference VREF2 from capacitor 606 when PWMi is high (i.e. during PWM ON). The value of VREF2 corresponds to the duration of the PWM OFF pulse, which information is stored on capacitor 606. Thus, whenever the capacitor 608 charges up during PWM ON to the same level that capacitor 606 charged up to during PWM OFF (i.e., corresponding to the width of the PWM OFF pulse), the output of comparator 610 goes high, thereby enabling the width of the PWM ON pulse to be forced to be the same as the previous PWM OFF pulse. It should be apparent that, for a desired duty cycle of ½, that the values of capacitor 606 and capacitor 608 should as close to each other as possible. It should be further apparent that different duty cycles and minimum PWM ON times can be accomplished using different values for capacitors 606 and 608.

In this example, the PWM ON block 406 produces output signals PWMfN and PWMrN, which are initially based on the PWMi and PWMNi signals produced by PWM OFF block 404, respectively. More particularly, PWMfN is high whenever PWMi is high or when OUT from comparator 610 is high. PWMrN is high whenever PWMi is low (i.e. PWM OFF or when PWMNi is high) or when OUT from comparator 610 is high. As should be apparent, this configuration allows the PWMi signal produced by PWM OFF block 404 to be overridden by the output of comparator 610, and thereby allows for controlling the width of the PWM ON pulse (i.e. corresponding to the duration of the PWMfN pulse) to be the same width as the PWM OFF pulse as measured by ping-pong circuit 602.

As further shown in this example, PWM ON block 406 also includes comparator 612 and logic circuit 614 that cooperate to produce an additional output PWMISHIGH. This signal is used in this example to make sure the PWM ON pulse is at least 800 ns (i.e. maximum switching frequency is 600 MHz in this example) and to make sure that VOUT2LOW fault condition is valid only when PWMISHIGH signal is set high, as will become more apparent below. This is an extra logic protection to prevent false trigger.

Moreover, it should be apparent that, in this example embodiment, during PWM OFF, the longer the OFF pulse, the larger the value of VREF2. Since for a very long OFF pulse (e.g. during a very light load condition), VREF2 could reach the VDD supply voltage and saturate, there is an up-down counter (not shown). Whenever VREF2 reaches 1.2V the counter increases by one, and capacitor 606 is discharged by a short pulse (CNDISCHIC1). Then, capacitor 606 is then charged up again by current source 604, and this process repeats until PWM goes high. Then during PWM ON, VREF2 (instead of 1.2V) and the up-down counter together are used as the reference for the minimum ON time comparator 610, this essentially forces the minimum ON pulse to be at least the same as the previous off time.

Figure 7:
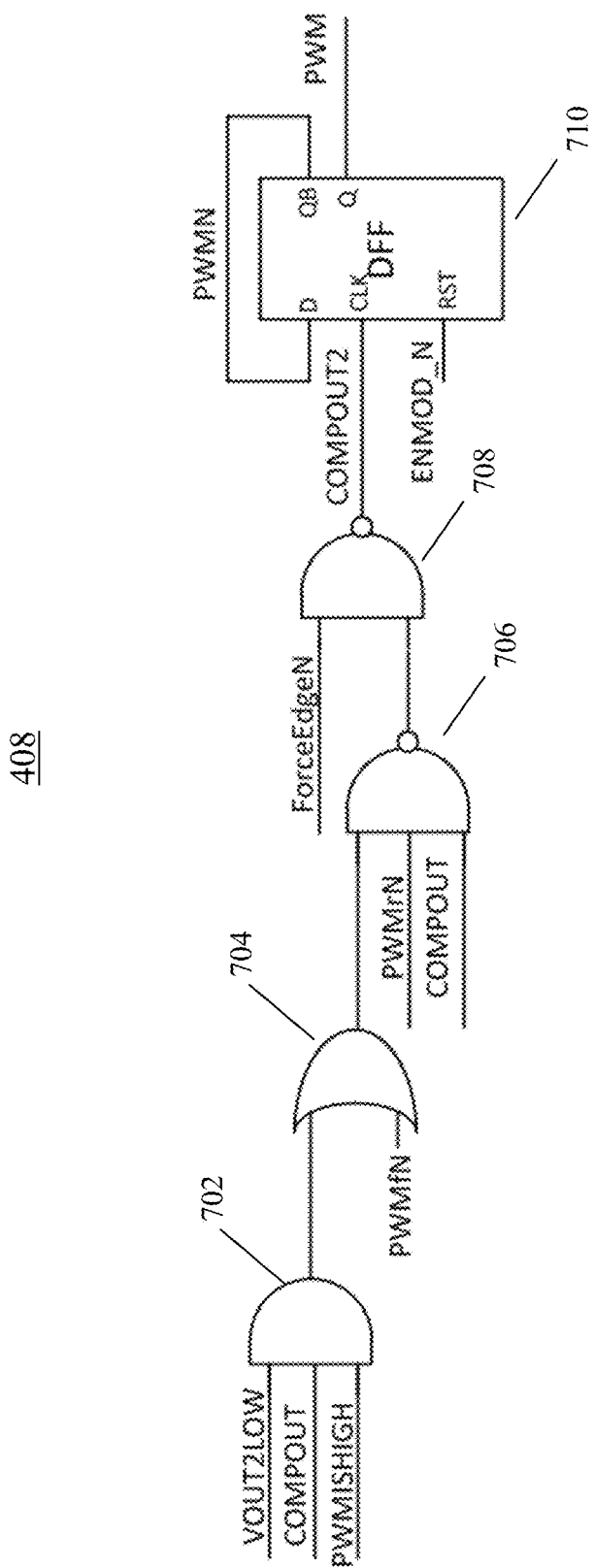
FIG. 7 is a block diagram illustrating an example block for generating a final PWM signal in accordance with the present embodiments.

FIG. 7 is a block diagram illustrating an example implementation of PWM Logic block 408.

In general, the PWM signal ultimately output by D flip-flop 710 will have a PWM ON time that has a duration corresponding to the duration of PWMfN output by PWM ON block 706, but with additional safeguards.

More particularly, as shown in this example, AND gate 702 outputs a high signal whenever VOUT2LOW, COMPOUT and PWMISHIGH are all high. OR gate 704 receives the output from AND gate 702 as well as the PWMfN signal from PWM ON block 406 and thus outputs a high signal whenever the output from AND gate 702 is high or the PWMfN signal is high. This allows for the PWM ON signal to be forced on even when the PWMfN signal is not on, for example, when VOUT is too low (i.e. UV protection).

As further shown in this example, NAND gate 706 receives the output from OR gate 704 as well as COMPOUT and the PWMrN signal from PWM ON block 406. The output of NAND gate 706 is thus low whenever all of the signals COMPOUT, PWMrN and the output from OR gate 704 are high, and high whenever one of such signals is low. NAND gate 708 receives the output from NAND gate 706 and ForceEdgeN and thus outputs (COMPOUT2) a low signal when both inputs are high, and a high signal whenever one input is low. This further allows for forcing maximum PWM on/off pulses (e.g. for a minimum switching frequency of 62 Hz).

The output COMPOUT2 from NAND gate 706 (which generally corresponds to the PWMfN signal, but as possibly modified as described above) is provided to the clock input of D-flip flop 710. The Q output of D flip-flop 710 thus causes the PWM signal to toggle between high and low states based on the transitions of the signal COMPOUT2, and for the PWM ON signal to generally have the same duration of the PWM OFF signal as described above.

Figure 8:
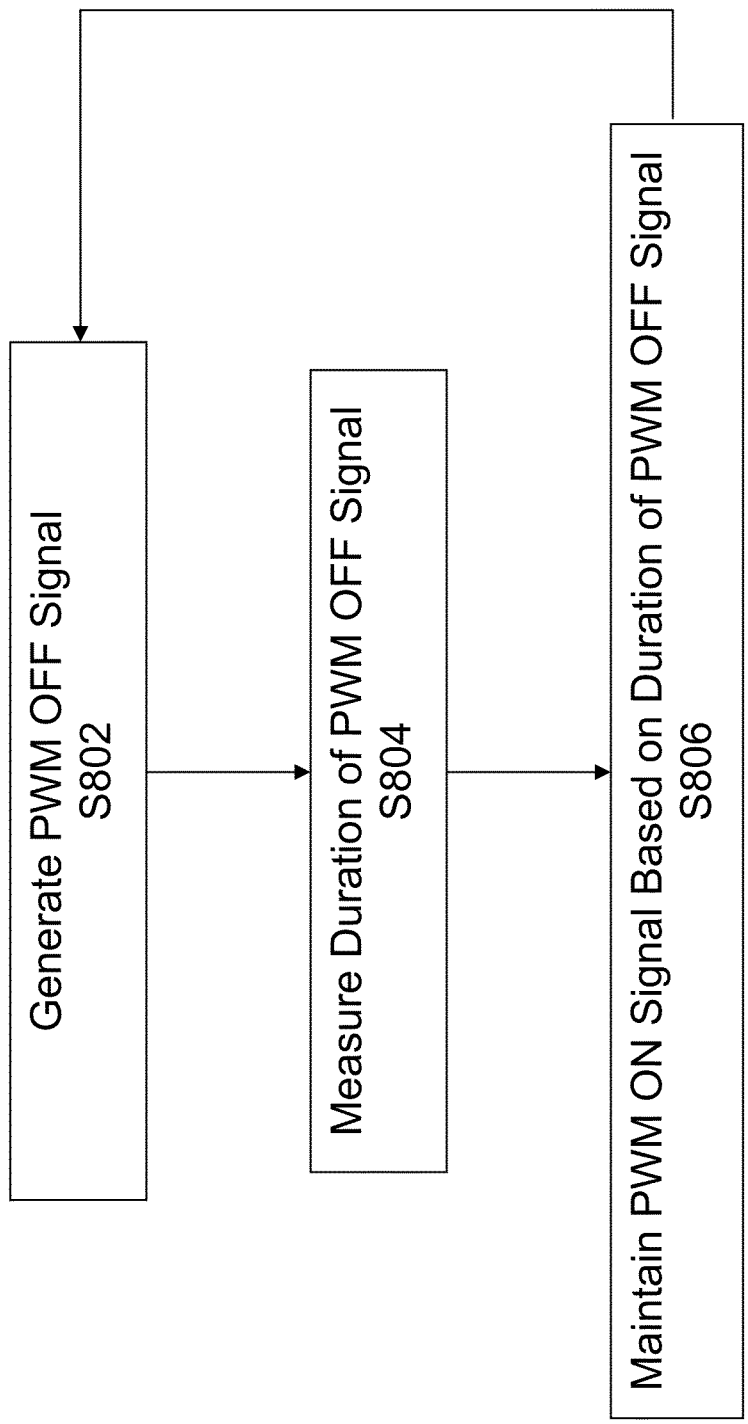
FIG. 8 is a flowchart illustrating an example PWM ON time control methodology according to the present embodiments.

FIG. 8 is a flowchart of an example frequency modulation methodology according to embodiments.

As shown in this example, in a step S802, a PWM OFF signal is generated. This can be based on VOUT and a desired step-down ratio, and can be done in a generally free-running manner. For example, as described above, PWM OFF can be generated whenever VOUT is higher than VTH (e.g., based on VIN/2 for a desired step-down ratio of 1/2), as long as the resulting PWM signal falls within a desired range of switching frequencies in this example.

In step S804, the time duration (i.e., width) of the PWM OFF signal is measured. For example, as described above, this can be accomplished by charging a capacitor for the duration of the PWM OFF pulse up to a threshold voltage.

In step S806, after the PWM OFF signal transitions, the PWM ON signal is generated using the measured time of the PWM OFF signal. For example, this can be done by charging a capacitor having the same value as the capacitor used for the PWM OFF pulse up to the same threshold value, and maintaining the PWM ON signal at least until the threshold value is reached.

The steps above can be repeated continuously until no power is required by the load.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A controller for a switched-capacitor converter that generates a PWM signal for converting an input voltage to an output voltage, the PWM signal having a PWM OFF portion and a PWM ON portion which together define a duty cycle of the PWM signal, the controller comprising:
   a PWM OFF logic block that generates the PWM OFF portion of the PWM signal wherein the PWM OFF logic block generates the PWM OFF portion of the PWM signal by comparing the output voltage to a first voltage that is proportional to the input voltage, and wherein an OFF duration of the PWM OFF portion of the PWM signal generated by the PWM OFF logic block is substantially equal to a duration of time that the output voltage exceeds the first voltage; and
   a PWM ON logic block that measures the OFF duration of the PWM OFF portion of the PWM signal and is configured to cause the PWM ON portion of the PWM signal to have an ON duration based on the measured OFF duration.

2. The controller of claim 1, wherein the duty cycle is ½ and the ON duration is substantially the same as the OFF duration.

3. The controller of claim 1, wherein the PWM ON logic block includes a first capacitor that is charged during the PWM OFF portion so as to measure the OFF duration of the PWM signal.

4. The controller of claim 1, wherein the PWM OFF logic block further includes an undervoltage protection circuit.

5. The controller of claim 1, further comprising minimum switching frequency protection circuitry.

6. The controller of claim 1, further comprising maximum switching frequency protection circuitry.

7. The controller of claim 1, wherein the first voltage is proportional to the input voltage by substantially a same fraction as the duty cycle.

8. The controller of claim 1, wherein the PWM signal is used to alternately charge and discharge a flying capacitor.

9. The controller of claim 3, wherein the PWM ON logic block further includes a second capacitor that is charged during the PWM ON portion, and wherein a voltage on the second capacitor is used to control the ON duration of the PWM signal.

10. The controller of claim 8, wherein the alternate charging and discharging of the flying capacitor is performed so as to provide an output voltage that is substantially a fraction of the input voltage, wherein the fraction is substantially a same fraction as the duty cycle.

11. A method for controlling a switched-capacitor converter that converts an input voltage to an output voltage based on a PWM signal, the PWM signal having a PWM OFF portion and a PWM ON portion which together define a duty cycle of the PWM signal, the method comprising:
   generating the PWM OFF portion of the PWM signal, wherein the PWM OFF portion of the PWM signal is generated by comparing the output voltage to a first voltage that is proportional to the input voltage, and wherein an OFF duration of the PWM OFF portion of the PWM signal generated by the PWM OFF logic block is substantially equal to a duration of time that the output voltage exceeds the first voltage;
   measuring the OFF duration of the PWM OFF portion of the PWM signal; and
   causing the PWM ON portion of the PWM signal to have an ON duration based on the OFF duration.

12. The method of claim 11, wherein the duty cycle is ½ and the ON duration is substantially the same as the OFF duration.

13. The method of claim 11, wherein measuring the OFF duration of the PWM OFF signal includes charging a first capacitor during the PWM OFF portion of the PWM signal.

14. The method of claim 11, further comprising protecting against an undervoltage condition of the output voltage.

15. The method of claim 11, further comprising protecting against a minimum switching frequency of the PWM signal.

16. The method of claim 11, further comprising protecting against a maximum switching frequency of the PWM signal.

17. The method of claim 11, wherein the first voltage is proportional to the input voltage by substantially a same fraction as the duty cycle.

18. The method of claim 11, wherein the PWM signal is used to alternately charge and discharge a flying capacitor.

19. The method of claim 13, wherein causing the ON duration of the PWM ON portion of the PWM signal to be based on the OFF duration includes charging a second capacitor during the PWM ON portion, and using a voltage on the second capacitor to control the ON duration of the PWM signal.

20. The method of claim 18, wherein the alternate charging and discharging of the flying capacitor is performed so as to provide an output voltage that is substantially a fraction of the input voltage, wherein the fraction is substantially a same fraction as the duty cycle.

* * * * *